F. BACON.
NUT LOCK.
APPLICATION FILED OCT. 18, 1909.
946,713. Patented Jan. 18, 1910.
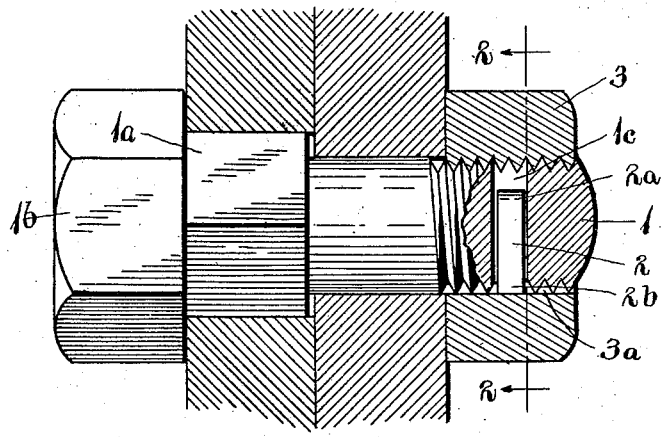
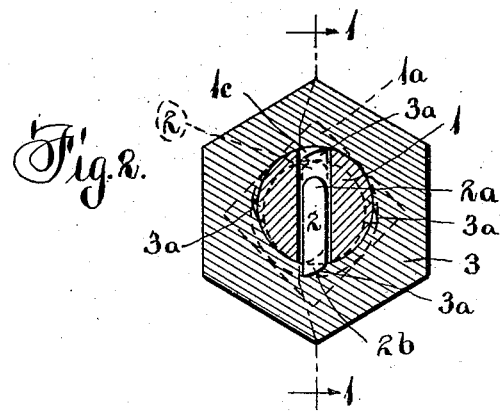
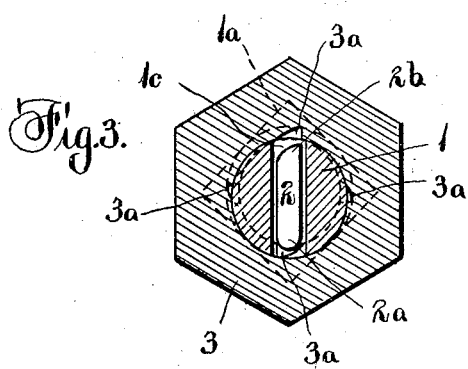
Witnesses:
Monroe E. Miller
Edward M. Wise
Frank Bacon, Inventor,
by Geo. E. Tew
Atty.

UNITED STATES PATENT OFFICE.

FRANK BACON, OF WEST NOTTINGHAM, OHIO.

NUT-LOCK.

946,713.

Specification of Letters Patent. Patented Jan. 18, 1910.

Application filed October 18, 1909. Serial No. 523,156.

*To all whom it may concern:*

Be it known that I, FRANK BACON, citizen of the United States, residing at West Nottingham, in the county of Cuyahoga and State of Ohio, have invented certain new and useful Improvements in Nut-Locks, of which the following is a specification.

This invention relates to nut locks, and particularly to that class thereof in which the nut is coupled to the bolt. For this purpose a pawl or device is used which is loosely held in a hole extending across in the threaded end of the bolt and arranged to engage a notch in the nut under certain conditions.

The device is particularly useful in rail joints and other places where the bolt is in a horizontal position, and is adapted especially for use when it is desirable that the nut shall never be removed from the bolt without manipulating the object to which it is applied. The bolt having means to hold it unrevoluble is inserted in a hole in the object to which it is applied so that the pawl will fall by gravity to engage a notch in the nut when it is screwed on the bolt; the pawl being unreleasable unless the object is turned. If desired the means for holding the bolt unrevoluble can be omitted and the bolt is then free to turn, the nut then being engaged by turning the bolt so that the pawl will fall by gravity to engage in the notch; and the pawl may be released by turning the bolt half way around, when the pawl will drop out of the notch, but the removal of the bolt is somewhat retarded by the other or rounded end of the pawl by its frictional contact with the notch in the nut; and the pawl may be held in a neutral position by turning the bolt so that the hole through same is horizontal.

The invention is illustrated in the accompanying drawings, in which—

Figure 1 is a side elevation, partly in longitudinal section on the line 1—1 in Fig. 2. Fig. 2 is a cross section on the line 2—2 of Fig. 1. Fig. 3 is a similar section with the bolt turned half way around.

Referring specifically to the drawings, 1 indicates a bolt having a head 1$^b$ and a shoulder 1$^a$. Extending across the threaded part of the bolt is a diametrical hole 1$^c$. The nut 3 is threaded as usual and has one or more longitudinal notches 3$^a$ in the bore thereof, one edge of the notch being tapered and the other being square, and forming a ratchet. A pawl or pin 2 rests in the hole 1$^c$ at a loose fit, one end 2$^a$ of the pin being rounded and the other end 2$^b$ being beveled to engage the shoulder or square edge of groove 3$^a$.

The horizontally arranged bolt being held unrevoluble by means of the square shoulder 1$^a$ fitting in a square hole in the object and the hole 1$^c$ therein and the pin 2 being in a vertical position causes the said pin to drop in the notches of the nut and thereby lock the nut to the bolt and preventing removal of the nut unless the bolt together with the object is turned about 180° so the pin 2 will drop as shown in Fig. 3 to release the nut allow the same to be turned off. This in most cases is impossible as the object is in itself unrevoluble and the nut is held permanently to the bolt unless there is a breakage of the object, or an upsetting of same, or other condition to release the bolt.

By omitting the shoulder, when it is desirable, the bolt is free to turn and the pin will engage the nut as before but by turning the bolt half way around the pin is disengaged and the nut is free to be turned off. The rounded end 2$^a$ of the pin, however, having a frictional contact with the grooves of the nut, retards the removal of same and if the bolt should become accidentally turned the nut would not be liable to turn off.

When the bolt is put in place it is set so that the hole is vertical with the bevel end of the pin down, in which position the nut can be turned thereon. The locking means are concealed, and the removal of the nut (when the unrevoluble means is omitted) by any person ignorant of the fact that the bolt must be turned over will be impossible.

By having the hole 1$^c$ extend entirely through the bolt the device can be produced cheaper than if it extended only part way, because in the former instance the hole can be punched, while in the latter case it must be drilled and machined. The hole is non-circular so that the pin will not turn therein. When the bolt is turned with the hole in horizontal position the pin rests in neutral position with both of its ends out of contact with the nut.

What I claim as new is:—

1. A nut lock comprising a bolt having a hole extending entirely across through the threaded part thereof, a pawl loosely held in the hole, and a nut having a ratchet groove extending across the threads therein, engageable by the pawl, the pawl being engaged or disengaged by turning the bolt.

2. A nut lock comprising a bolt having a hole across the threaded part thereof, a gravity pin held in the hole, said pin being of less length than the diameter of the bolt and a nut on the bolt having a groove across the threads within the same, with which the end of the pin has engagement when the hole is vertical.

In testimony whereof, I affix my signature in presence of two witnesses.

FRANK BACON.

Witnesses:
    BEN GOGGE,
    MONROE E. MILLER.